United States Patent [19]

Voegeli

[11] 3,906,468

[45] Sept. 16, 1975

[54] SEMICIRCULAR MAGNETIC DOMAIN PROPAGATION APPARATUS

[75] Inventor: Otto Voegeli, San Jose, Calif.

[73] Assignee: International Business Machines Corporation, Armonk, N.Y.

[22] Filed: May 28, 1974

[21] Appl. No.: 473,952

[52] U.S. Cl. .................. 340/174 TF; 340/174 SR; 340/174 VA

[51] Int. Cl.$^2$ .................. G11C 11/14; G11C 19/08

[58] Field of Search .. 340/174 TF, 174 SR, 174 VA

[56] References Cited

UNITED STATES PATENTS

| | | | |
|---|---|---|---|
| 3,646,530 | 2/1972 | Chow | 340/174 TF |
| 3,699,547 | 10/1972 | Owens et al. | 340/174 TF |
| 3,701,129 | 10/1972 | Copeland | 340/174 TF |
| 3,789,374 | 1/1974 | Sherman | 340/174 VA |

*Primary Examiner*—Stanley M. Urynowicz, Jr.
*Attorney, Agent, or Firm*—Joseph E. Kieninger

[57] ABSTRACT

Semicircular magnetic domains are propagated along a narrow track. Magnetostatic interaction prevents two domains from being situated directly opposite each other on the track and thus binary data storage can occur using bubble presence on the sides of the track as 1's or 0's. A shift register can comprise a pair of domain generators, the propagation track with or without propagating means and a pair of sensors and annihilators, one of the domain generators, sensors and annihilators being located on each side of the track. A loop store may comprise tracks formed on the circumference of a cylinder of the domain medium. The track can be formed by a physical separation in the domain medium, such as a physical crack scribed by a laser beam or by ion-milling grooves. The track can also be defined by a narrow region with in-plane anisotropy formed by ion implantation.

6 Claims, 6 Drawing Figures

PATENTED SEP 16 1975 3,906,468

SEMICIRCULAR MAGNETIC DOMAIN PROPAGATION APPARATUS

BACKGROUND OF THE INVENTION

This invention relates generally to information storage devices and more particularly to thin film single wall domain devices.

FIELD OF THE INVENTION

A single wall or bubble domain for the present invention is defined as a magnetic domain bounded by a domain wall which closes on itself in the plane of a host magnetic medium and has a geometry independent of the boundaries of a sheet of the medium in the plane in which it is moved. The term bubble domain includes circular wall-shaped domains, elongated circular or stripe domains, and segment domains where a portion of the domain boundary is completed by a magnetic discontinuity such as a boundary of the sheet. Inasmuch as a bubble domain is self-defined in a plane of movement, it is free to move in two dimensions and such a plane as is now well known.

The movement of domains is normally performed by generating localized fields within the host magnetic layer of a polarity to attract domains. Materials which are well known in the art for their ability to support bubble domains are rare earth orthoferrites and garnets. These materials have preferred directions of magnetization substantially normal to the plane of the sheet. A bubble domain, in a material of this type, is magnetized in one direction along its axis whereas the remainder of the layer is magnetized in the opposite direction, the domain appearing as a dipole oriented normal to the plane of the layer. Other single crystal magnetic materials may be used as bubble domain carriers so long as the magnetic material is anisotropic with the easy axis of magnetization normal to the plane of the sheet.

DESCRIPTION OF THE PRIOR ART

In the prior art the bubble domains typically formed a circular shaped wall in the host magnetic medium. The circular bubble domains took up a large area in a domain system because individual bubble domains had to be separated from each other by several bubble domain diameters to counteract the repulsive or interaction forces between them.

Therefore one object of the present invention is to provide a bubble domain system that permits greatly increased packing density.

Another object of the present invention is to provide a bubble domain store system that used non-circular domains to increase storage density.

Yet another object is to provide a bubble domain system that uses the interactive forces between bubble domains to advantage.

The use of non-circular bubble domains in itself is known in the art as evidenced by U.S. Pat. No. 3,701,129. In this patent, non-circular bubble domains can be encoded and sensed according to the wall of a band or stripe of the bubble medium to which the bubble domain is attached. However the stripe faced the problem of width formation especially with the usage of sub-micron domains since the width of the stripe must be typically about equal to the diameter of the domain. The interactive definition of stored information by the domains required definition by the structure of the device. The stripe essentially comprised a source supplying the equivalent of a bias field for maintaining a domain at a preselected diameter.

It is therefore also an object of the present invention to provide a stable bubble domain system that uses non-circular bubble domains.

SUMMARY OF THE INVENTION

The present invention is characterized by the use of non-circular or essentially semicircular bubble domains aligned on both sides of a magnetic discontinuity or track formed in a host magnetic medium supporting the domain. The track is narrower than the diameter of the domains thus permitting magnetostatic interaction between adjacent domains. Magnetostatic interaction prevents two domains from being situated directly opposite each other along the track, that is, domains periodically form on both sides of the track. Binary bit information can be stored in the semicircular bubble domain according to its location on one side of the track or the other. The track can be formed by a physical separation in the domain medium or by producing a line having an in-plane anisotropy.

A shift register according to the disclosed invention comprises a pair of domain generators, a propagation track, and a pair of sensors and annihilators. One of the domain generators, sensors and annihilators are located on each side of the track to form a domain of the required binary sense. Each time a new domain is generated at one end of the register, a domain is sensed and annihilated at the other end of the track. The domains in the shift register shift by one position by their own magnetostatic interaction each time a new domain is generated. Further means for providing the propagation of the domains may be provided. Likewise a closed loop store can comprise a track formed on the circumference of a cylinder of the domain medium. A plurality of tracks can be formed in the domain medium to establish an information store.

It is therefore an object of the present invention to provide an enhanced bubble domain system.

It is another object of the present invention to provide a magnetic domain arrangement which propagates domains along a prescribed track.

It is yet another object to provide a domain system characterized by the use of semicircular domains propagated along a predetermined track.

Another object is to provide an information storage arrangement which generates, stores and senses domains along a magnetic discontinuity formed in the host magnetic medium of the domains.

Still another object is to provide an information storage arrangement using semicircular domains comprising a pair of domain generators, a propagation track, a pair of sensing means, and a pair of annihilating means.

Yet another object is to provide an information storage arrangement wherein the information is stored in bubble domains according to the side of the track on which the bubble is located.

These and other objects of the present invention will become apparent to those skilled in the art as the description of the preferred embodiments proceeds.

BRIEF DESCRIPTION OF THE DRAWING

The novel features of the invention, as well as the invention itself, both as to its organization and method of operation, will best be understood from the following description when read in conjunction with the accompanying drawing in which.

DESCRIPTION OF PREFERRED EMBODIMENTS

In general the embodiment of the present invention discloses a bubble domain system that is characterized by an increased packing density of the domain in that non-circular or essentially semicircular bubbles are located along a predetermined magnetic discontinuity in a host magnetic layer for the domains. The bubbles are aligned on both sides of the discontinuity, hereinafter described as a propagation track or simply track. If the track is sufficiently narrow, the bubbles will not align directly opposite each other because of magnetostatic interaction between adjacent domains. The domains rendered will essentially be semicircular rather than of a circular shape. The semicircular domains are stable along the track because the track represents a segment of the domain boundary where no domain wall need be formed. The semicircular domain will strongly attach to the track because, once attached, separation required an increased wall energy. Magnetostatic interaction between two domains will prevent domains from becoming situated directly opposite each other and thus the domains will be periodically spaced along either side of the track. If a binary representation is given to each side of the track, a series of domains placed along the sides of the track can be considered to be a serial representation of binary data, or in other words an information storage device or shift register.

Figures 1, 2:
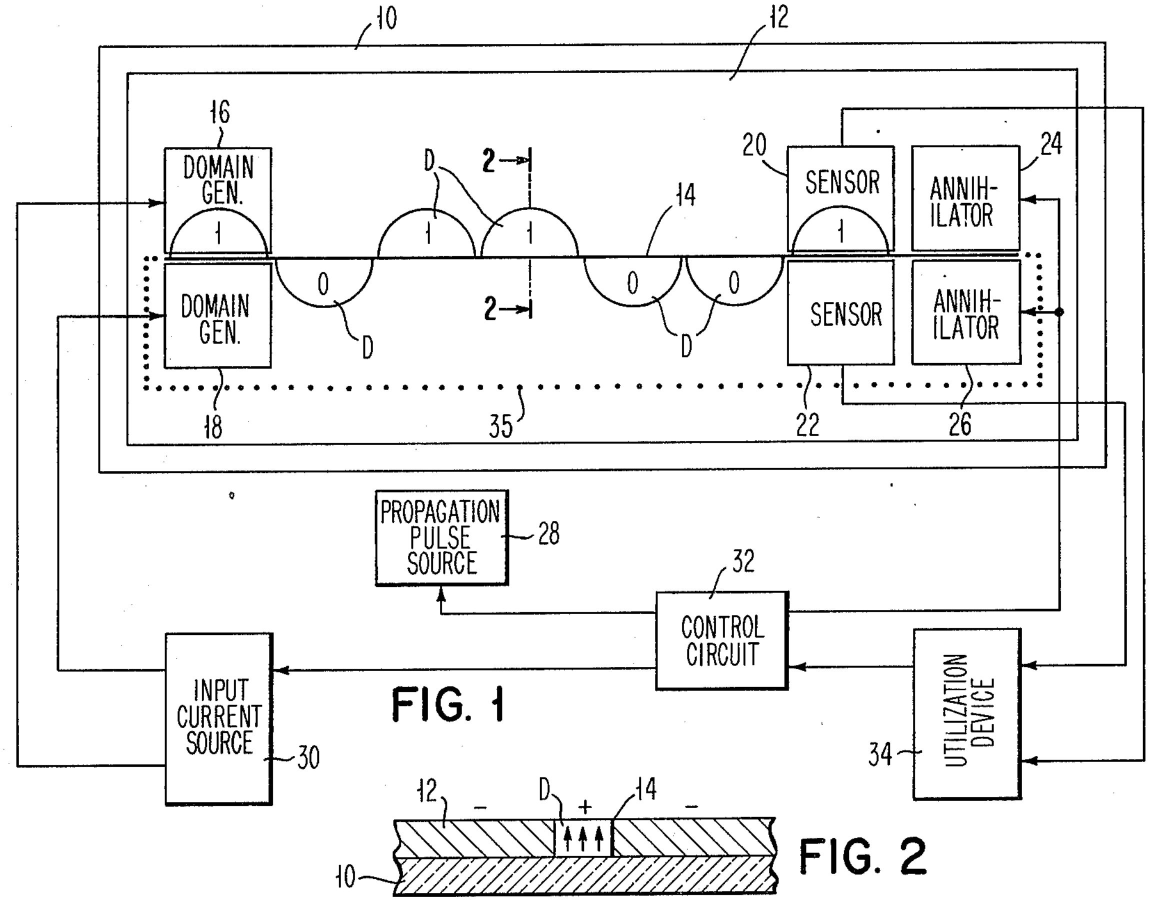
FIG. 1 is a schematic representation of an information storage arrangement using bubble domains in accordance with the present invention.
FIG. 2 is a cross-sectional view of the propagation track with one domain element taken along lines 2—2 of FIG. 1.

FIG. 1 shows an illustrative arrangement of a shift register including a substrate 10 on which a host magnetic layer 12 of magnetic material can be grown epitaxially, for example, from a liquid phase. Typically, a single crystal epitaxial film is formed over the entire surface of the substrate 10. A track 14 is then formed in the magnetic layer 12 by a controlled crack propagation in stressed films, such as using a gadolinium iron garnet (GdIG) film on a gadolinium gallium garnet (GGG) substrate. The controlled crack can be propagated either by mechanical or laser scribing or by ion-milling grooves into the film surface. Typical track gaps can also be formed by ion-milling through the entire thickness of the magnetic film layer. Forming the track gap by controlled crack propagation in stressed film or by ion milling is well known in the art and need not be further described here. The width of the track 14 is limited by the interactive forces required to prevent bubbles form aligning on both sides of the track so that bubble domain presence on opposite sides can be designated as a 0 and 1 information bit respectively. Thus the width of the track 14 should be less than the diameter of the bubble domain. The magnetostatic interaction between bubble domains becomes marginal when the domains are separated by a distance greater than their diameter.

FIG. 1 describes an improved lateral displacement coding shift register which has the further advantage of greatly increased tracking density. Essentially semicircular domains D are formed along the track 14 rather than the normal circular shaped domain. As shown in FIG. 1, seven semicircular domains D, each storing one binary bit of information, are spaced along the track 14 but it is evident that a more complete series of domains can be placed along the track to complete a shift register of the size required.

The form of the domain can be seen by referring to FIG. 2 which shows a cross-sectional view of one domain. The substrate 10, such as glass, supports the magnetic film layer 12. The domain D is positioned immediately next to the track 14. The magnetic discontinuity of the track 14 forces the wall of the domain to be juxtaposed to the track. The domain D is shown with arrows pointing upward. This assumes that the convention is adopted that the host domain film layer 12 is saturated magnetically in a negative (downward) direction along an axis normal to the plane of the layer and that the magnetization of the single-wall domain D are in an upward or positive direction along the same axis.

Only one shift register is shown in FIG. 1, but it is evident that by forming a plurality of tracks 14 in the host magnetic layer 12, a plurality of shift registers and thus an information storage system can be formed. Each shift register of the store can comprise a pair of domain generators 16 and 18, the propagation track 14, a pair of sensors 20 and 22, and a pair of annihilators 24 and 26. Since the track 14 of this embodiment comprises a train of domains D, each time a new domain is generated by a domain generator 16 or 18 at one end, a domain is sensed and annihilated at the other end of the track. The train of domains D shifts by one position. Although the magnetostatic interaction between domains D may be sufficient to shift all of the domains D, it may be necessary to implement some additional drive mechanism to facilitate the propagation of the domains along the track and thus a propagation pulse source 28 is shown. The propagation pulse source 28 may control a plurality of conductors (not shown) formed in a serpentine geometry offset from one another for producing magnetic fields for moving domains along the track 14 when pulsed. The conductors are connected between the propagation pulse source 28 and a ground potential, and are pulsed alternatively first with pulses of one polarity and then with pulses of the opposite polarity in a format that is well known in the art.

There are a variety of techniques for moving single wall domains. One comprises offset conductor loops pulsed in sequence to displace domains to next consecutive positions. The displacement is effected by the magnetic field gradient temporarily induced by the current pulse in the conductors. Another technique for moving single wall domains employs a magnetically soft structural overlay. The overlay generates a dynamic pattern of magnetic poles which move in the overlay in response to controlled changes in directions of an externally produced magnetic field applied parallel to the plane of the sheet. Similarly, a sawtooth pattern could be formed in an overlay to control the domain movement. It is obvious that many types of propagation means may be used with the present embodiment. The propagation means is used merely to implement an additional drive to facilitate domain propagation, if necessary to speed domain movement.

Still referring to FIG. 1, the domain generators 16 and 18 create the domains D at one end of the track 14. Each domain generator forms domains on its side of the track. The domain generators 16 and 18 are controlled by an input current source 30 which sends a controlled current through the conductors of the domain generators 16 and 18 to form the domains D by nucleation. The input current source 30 is controlled by a control circuit 32 which controls the generation, propagation and utilization of the domains. An embodiment of the type of domain generators 16 and 18 shown in FIG. 1 and useful for generating domains for the present invention is shown in FIGS. 3 and 4.

Figures 3, 5:
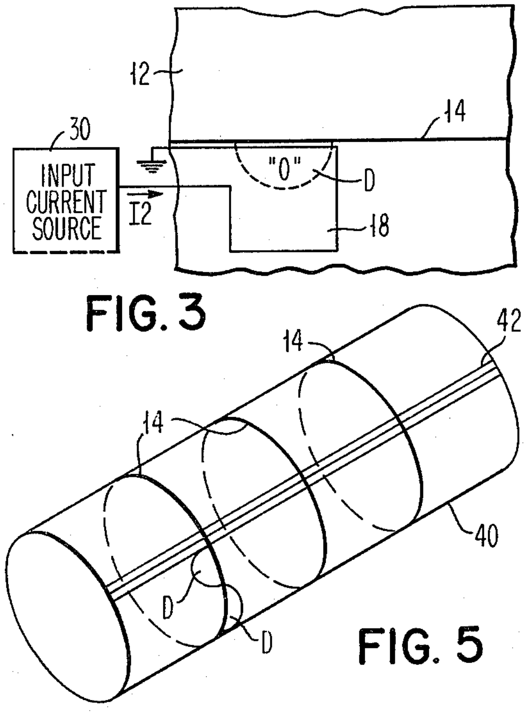
FIGS. 3 and 4 are a schematic representation of the pair of domain generators shown in FIG. 1.
FIG. 5 shows a cylindrical shaped bubble domain arrangement using the present invention.
Figure 4:
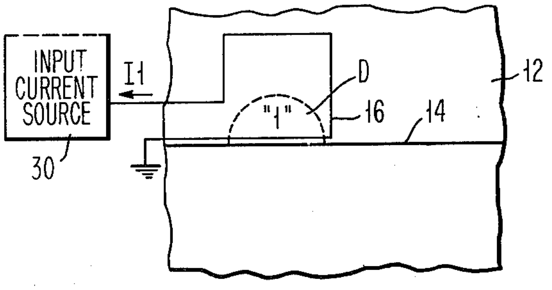

Referring now to FIG. 1 and especially to FIGS. 3 and 4, the domain generators 16 and 18 are shown nucleating bubble domains D. In FIG. 3, as a current 12 is generated by the input current source 30 in the direction of the arrow, a semicircular bubble domain D is formed on the bottom side of the track 14 by domain generator 18. Domains formed on the bottom side of the track 14 in the plane of the figures is represented as a binary 0 bit of data information. Therefore, when current 12 is actuated, a 0 information bit is formed. Likewise in FIG. 4 when the domain generator 16 is actuated by sending a current pulse 11 through the domain generator 16 from the input current source 30, the semicircular domain D is formed on the top of the track 14. Domains on the top side of the track 14 may then be given the designation of a binary 1 data information. By selectively actuating either of the domain generators 16 or 18, data information can be serially placed along the track 14. Then either by actuating the propagation means, the propagation pulse source and appropriate propagation conductors, or by the innate magnetostatic interaction of the magnetic bubble domains, the domains D can be propagated down the track 14 to the pair of sensors 20 and 22 located at the other end of the track 14.

The pair of sensors 20 and 22 shown in FIG. 1 can comprise first and second magnetoresistive elements. Magnetoresistive elements and their use for providing signals indicative of the presence of a magnetic field provided by magnetic domains are now well understood in the art. Therefore, the elements are not discussed in detail here. It is sufficient to state that in operation, the magnetoresistive elements are disposed adjacent to the track 14 for generating signals under the control of the control circuit 32 and are responsive to the field associated with the domains. The resultant signals are amplified and applied to the utilization circuit 34 for use therein. If the magnetostatic interaction of the domain is used to transmit the domains down the track, it is preferred that a pair of annihilators 24 and 26 be used to annihilate the domains either during sensing of the domains or immediately thereafter. It is evident that many different types of sensors 20 and 22 and annihilators 24 and 26 could be used in the embodiment including the present invention. The inclusion of magnetoresistive sensors should not be taken to limit the present invention.

In information storage arrangements, where for instance a circular shift register is provided and domains after being sensed are not annihilated but directed back to the input, the domain generators 16 and 18 can be operative for gating existing domains rather than to nucleate a domain. A reduced drive field is thus obtained since domain nucleation requires large amounts of current. The return closed loop path could be an oval track comprising a similar construction as that of the register according to the present invention or the return path of the closed loop could be a channel comprising a magnetically soft strip of, for example, low coercive force permalloy. The domains can be recirculated after sensing and merely displaced to the correct sense for representing data information or a pool of 1 and 0 domains can be stored at each domain generator input. The closed loop formation militates against information loss and leads to increased packing density. The closed loop track is shown by a dotted line 35 in FIG. 1.

The information store using the present invention may also comprise a circulating loop store such as shown in FIG. 5. In FIG. 5, the domain medium is in the form of a cylinder 40 having a plurality of tracks 14, three shown, circumscribing its circumference. Semicircular domains D are appropriately positioned on each track according to the information required. It is obvious that suitable generation and sensing means are situated along each track 14. Likewise propagation means may be included, if necessary, such as conductors 42. The information store of FIG. 5 may be a read-only store wherein the bubble domains are externally generated along the tracks 14 and appropriately sensed and propagated. The cylinder 40 may comprise a layer of amorphous magnetic material supporting bubble domains formed on a cylindrical substrate.

The density advantage of the present invention is shown in FIg. 5 but it is applicable to the embodiment of the invention shown in FIG. 1. A plurality of tracks 14 can be placed with a separation of approximately twice the diameter of the bubble domains D. This leaves a minimum separation between adjacent bubble domains on separate tracks of one domain diameter. The minimum separation is taken to be that distance which will prevent magnetostatic interaction of a bubble domain on a track from affecting the propagation of bubble domains on an adjacent track. Thus an increased density is accomplished in two ways. First, the decreased size of the bubble domain permits placing adjacent store units closer together on separate tracks since essentially semicircular bubble domains are used. Second, a decreased distance is obtained between adjacent bubble domains on the same track since magnetostatic interaction between adjacent bubble domains is used to advantage rather than limiting the distance between which adjacent bubbles can be placed.

Formation of essentially semicircular domains occurs also on other types of magnetic discontinuities besides a physical gap in the host magnetic layer of the bubble domain. One such discontinuity is a narrow strip in the layer having an in-plane anisotropy. Each edge of the strip acts much like a fixed domain wall and thus has much the same effect as a physical gap. Thus the track 14 of FIGS. 1 and 5 can be formed in the host magnetic layer 12 by forcing a thin line of the layer into having an in-plane anisotropic field. Techniques for inducing an in-plane anisotropic line by means of such as ion implantation are well known in the art. It is sufficient for the purposes of the present invention that the ion implanted line form a magnetic discontinuity and a sufficiently narrow track either in the form of that shown in FIG. 1 or in the form of a circular closed loop track as shown in FIG. 5. The formation of the semicircular domains along the ion implanted track is shown in FIG. 6.

Figure 6:
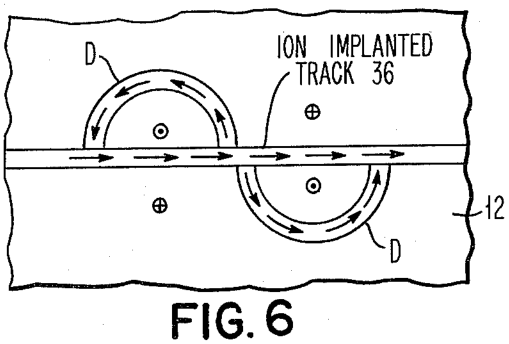
FIG. 6 shows another embodiment of the present invention with an in-plane anisotropic track and semicircular domains located along the track.

Referring now to FIG. 6, the ion implanted track 36 is shown formed in the host magnetic layer 12. As shown by the arrows in the track 36, the magnetic lines are ion planted to be in the plane of the magnetic layer 12. Using the similar convention as previously described, with the host magnetic layer being saturated magnetically in a downward or negative direction along an axis normal to the plane of the magnetic layer 12, the magnetization of the single wall domains D are in an upward or positive direction along the same axis. The walls of the domains D have a polarity such that the track 36 forms a portion of its wall. Again, if the track 36 is sufficiently narrow, the magnetostatic interaction between two domains will prevent the domains from being situated opposite each other along the track. Thus, the ion implanted track 36 of FIG. 6 can be used in the embodiments of the shift register as described in FIG. 1.

What has been described is considered to be only illustrative of the principles of the present invention. It will be immediately obvious to those skilled in the art many modifications of structure, arrangements, proportions, the elements, materials and components used in the practice of the present invention. For instance, it is evident that the host magnetic layer 12 could be formed from any one of the well known rare earth orthoferrites or from an amorphous material as well as a garnet film. The appended claims are therefore intended to cover and embrace any such modifications, within the limits only of the true spirit and scope of the invention.

What is claimed is:

1. A magnetic domain arrangement comprising:

a host magnetic medium in which bubble domains can be moved;

a track comprising a magnetic discontinuity formed in said host medium; and means for generating substantially semicircular bubble domains along both sides of said track and outside of said track, with said track forming a segment of the bubble domain boundary, locations of the domains on one side or the other of the track determining a binary information storage bit, wherein interaction between adjacent domains provides serial spacing of the domains along a length of said track.

2. A magnetic domain arrangement as described in claim 1 wherein said track is a gap discontinuity in said host medium.

3. A magnetic domain arrangement as described in claim 1 wherein said track is a strip having an in-plane anisotropic field formed in said host medium.

4. A magnetic domain arrangement as described in claim 1 further including means for sensing the bubble domains along said track.

5. A magnetic domain arrangement as described in claim 1 wherein said host medium forms a cylinder with said track circumscribing the host medium.

6. A magnetic domain arrangement as described in claim 1 wherein the width of said track is less that the diameter of said bubble domain.

* * * * *